US011367172B2

(12) United States Patent
Voyer et al.

(10) Patent No.: US 11,367,172 B2
(45) Date of Patent: Jun. 21, 2022

(54) WOOD LABELING SYSTEM AND METHOD FOR LABELING WOOD PRODUCTS IN A PRODUCTION LINE

(71) Applicant: TIMBER TECHNOLOGY INC., Levis (CA)

(72) Inventors: Marc Voyer, Québec (CA); Marc-Antoine Paquet, St-Henri (CA)

(73) Assignee: TIMBER TECHNOLOGY INC., Lévis (CA)

( * ) Notice: Subject to any disclaimer, the term of this patent is extended or adjusted under 35 U.S.C. 154(b) by 214 days.

(21) Appl. No.: 16/853,968

(22) Filed: Apr. 21, 2020

(65) Prior Publication Data

US 2020/0342585 A1 Oct. 29, 2020

(30) Foreign Application Priority Data

Apr. 23, 2019 (CA) .............................. CA 3040946

(51) Int. Cl.
*G06K 9/00* (2022.01)
*G06T 7/00* (2017.01)
*G06T 7/20* (2017.01)
*G06T 7/70* (2017.01)
*H04N 5/235* (2006.01)
*H04N 7/18* (2006.01)
*H04N 5/225* (2006.01)

(52) U.S. Cl.
CPC .............. *G06T 7/0004* (2013.01); *G06T 7/20* (2013.01); *G06T 7/70* (2017.01); *G06T 7/97* (2017.01); *H04N 5/2256* (2013.01); *H04N 5/2354* (2013.01); *H04N 7/18* (2013.01); *G06T 2207/10016* (2013.01); *G06T 2207/30161* (2013.01)

(58) Field of Classification Search
CPC ........... G06T 7/0004; G06T 7/20; G06T 7/70; G06T 7/97; G06T 2207/10016; G06T 2207/30161; H04N 5/2256; H04N 5/2354; H04N 7/18; H04N 5/2257; H04N 5/232; H04N 7/181
USPC ...................................................... 382/103
See application file for complete search history.

(56) References Cited

U.S. PATENT DOCUMENTS

| 9,874,803 | B2 | 1/2018 | Blomquist et al. |
| 10,178,355 | B2 | 1/2019 | Voyer et al. |
| 2017/0257603 | A1* | 9/2017 | Voyer ....................... G06T 7/70 |
| 2018/0107101 | A1 | 4/2018 | Blomquist et al. |

* cited by examiner

*Primary Examiner* — Stephen P Coleman
(74) *Attorney, Agent, or Firm* — Norton Rose Fulbright Canada LLP; Reno Lessard

(57) ABSTRACT

There is described a method of labeling wood products moved across a handling area of a production line. The method generally has, using a camera, generating an image representing a wood product moving across the handling area at a first moment in time; using a controller, determining coordinates of the wood product at the first moment in time based on the image; and anticipating coordinates of the wood product at a second moment in time assuming an incremental movement of the wood product at a given speed from the determined coordinates of the wood product at the first moment in time; and using a light projector, projecting, at the second moment in time, a wood product label at the anticipated coordinates of the wood product at the second moment in time.

19 Claims, 7 Drawing Sheets

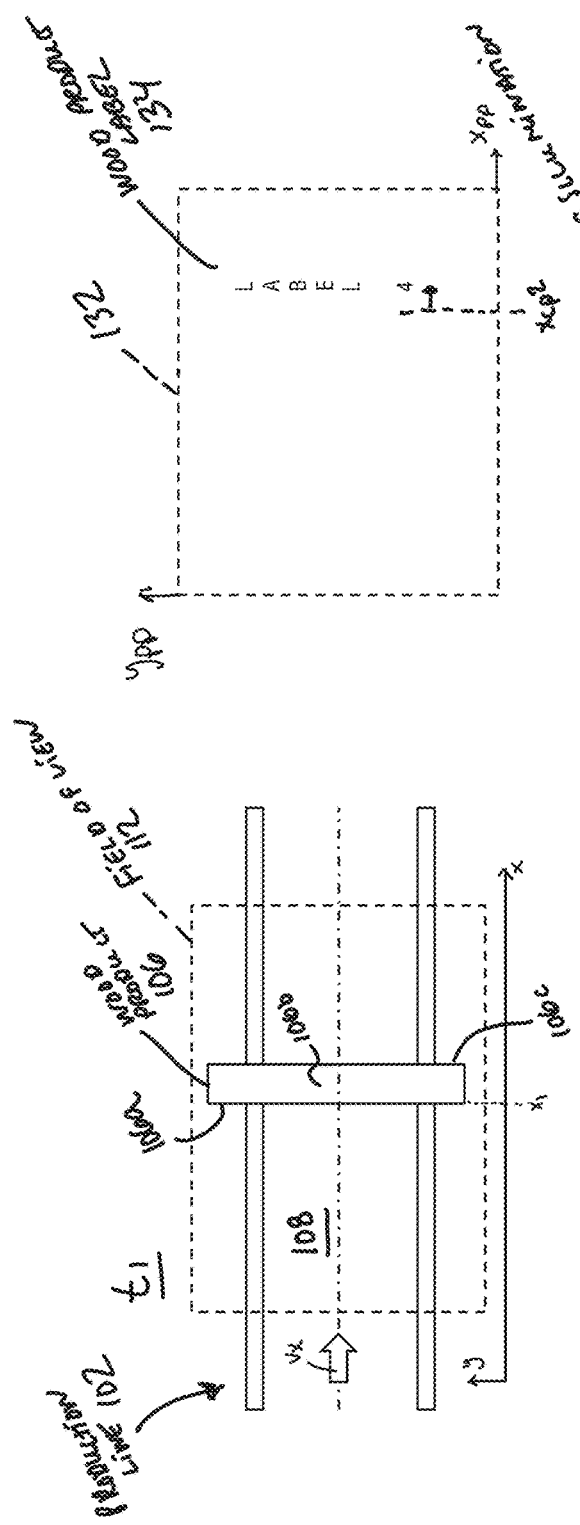
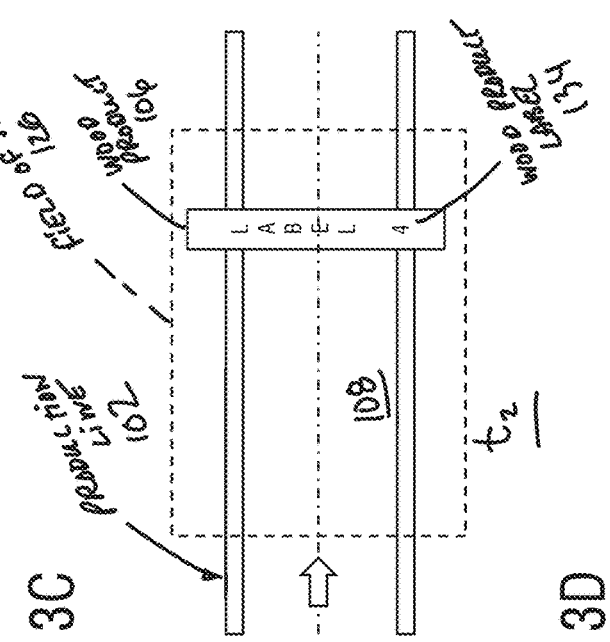
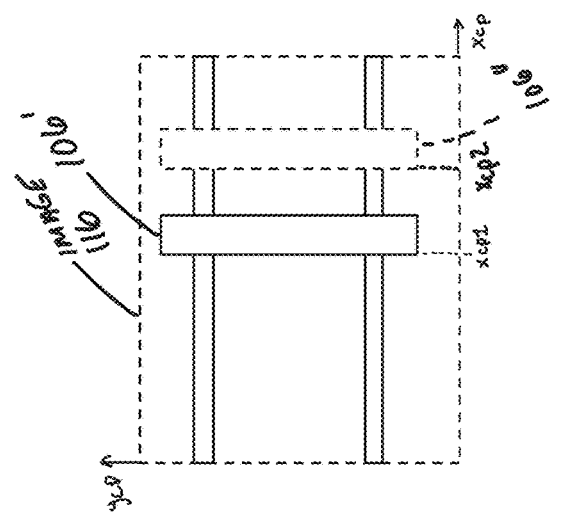
Fig. 3A
Fig. 3B
Fig. 3C
Fig. 3D

WOOD LABELING SYSTEM AND METHOD FOR LABELING WOOD PRODUCTS IN A PRODUCTION LINE

FIELD

The improvements generally relate to a wood product production line including an optimizer and a trimmer, and more particularly relates to a labeling system which labels the wood products between the optimizer and the trimmer.

BACKGROUND

In the wood product industry, prices can vary on a daily basis. Accordingly, it is of importance for a wood product producer to optimize its production based on the current prices. More specifically, the pricing of the wood product can vary depending of its dimensions (e.g. length) and quality. Although greater length of wood products is typically associated with greater pricing, the presence of a defect along a length of the wood product can negatively affect the quality level of the product as a whole. Accordingly, in some instances, it is preferable to trim the defect off in a manner to obtain a shorter wood product of a greater quality, for instance.

Considering that, in a typical production line, the wood products are moved at a speed that can range between 366 m/min (1200 ft./min) and 610 m/min (2000 ft/min), these decisions have to be taken in an automated manner.

Accordingly, an example of a production line can include one or more conveyors for moving, for instance, wood products from a wood product optimizer to a wood product trimmer (simply referred to as "the optimizer" and "the trimmer"). The optimizer is generally configured to scan successive ones of the wood products, to decide whether or not and how to trim each wood product based on the current prices and to generate optimization data that the trimmer can use as cutting instructions on how to trim the wood product.

To ensure that given optimization data be used for a corresponding wood product, the typical production line generally includes a wood labeling system. An example of such a wood labeling system is provided in Canadian Patent Application No. 2 245 412 A1. For instance, this wood labeling system applies an information label indicative of the optimization data on each wood product following scanning by the optimizer using upper and lower pairs of luminescent ink-jet devices. Prior to arriving to the trimmer, the wood labeling system uses optical sensing devices each having luminescence inducing light source to read the information label and generates an output signal based on the reading of the optical sensing devices. The output signal is then used by the trimmer as cutting instructions to trim the wood product in accordance with its optimization data.

Although existing wood labeling systems are satisfactory to a certain degree, there remains room for improvement.

SUMMARY

More specifically, there is a specific need in avoiding the use of ink-jet devices, and any other permanent labeling device, in such a production line. For instance, maintenance of these marking permanent labeling device has been found to be costly in terms of productivity because any time one of the permanent labeling device breaks, the production line has to be stopped for a given period of time. Moreover, applying a permanent information label onto a defect of the wood product may later prevent readability of the information label. For at least these reasons, existing wood labeling systems have been found considerably impairing the productivity of the production line.

There is provided a wood labeling system using computer vision which can avoid the aforementioned drawbacks of the existing wood labeling systems. By analyzing successive images of a handling area, each wood product can be tracked and impermanently labeled using a light projector as the wood products are moved between the optimizer and the trimmer, without applying permanent labels directly on the wood product. It was found that by impermanently applying information labels, including optimization data for instance, on the woods products moving across the handling area can allow skilled operators to assess the accuracy of the information displayed on the moving wood products, and react accordingly. For instance, should the displayed information be inaccurate (e.g., due to one or more parts of the optimizer being worn or otherwise broken), a skilled operator could, at a glance, realize that inaccurate optimization data are being projected on the moving wood products and stop the production line right away to fix the worn or broken parts of the optimizer so as to restart the production line as swiftly as possible.

It is thus contemplated that an aim of the wood labeling system is to reduce costs associated to existing wood labeling systems (e.g., costs of luminescent ink, costs of ink-jet device parts, costs of the maintenance thereof, costs associated to the presence of unidentifiable wood product along the production line).

In accordance with one aspect, there is provided a method of labeling wood products moved across a handling area of a production line, the method comprising: using a camera having a field of view encompassing at least a portion of said handling area, generating an image representing a wood product moving across the handling area at a first moment in time; using a controller, determining coordinates of the wood product at the first moment in time based on the image; and anticipating coordinates of the wood product at a second moment in time assuming an incremental movement of the wood product at a given speed from the determined coordinates of the wood product at the first moment in time; and using a light projector having a field of illumination encompassing at least a portion of said handling area, projecting, at the second moment in time, a wood product label at the anticipated coordinates of the wood product at the second moment in time.

In accordance with another aspect, there is provided a wood labeling system for a production line, the wood labeling system comprising: a conveyor configured for moving a plurality of wood products across a handling area of the production line; a camera having a field of view encompassing at least a portion of said handling area and generating an image representing at least one of the wood products moving across the handling area at a first moment in time; a controller in communication with the camera, the controller determining coordinates of the wood product at the first moment in time based on the image, and anticipating coordinates of the wood product at a second moment in time assuming an incremental movement of the wood product at a given speed from the determined coordinates of the wood product at the first moment in time: and a light projector having a field of illumination encompassing at least a portion of said handling area and in communication with the controller, the light projector projecting, at the second moment in time, a wood product label at the anticipated coordinates of the wood product at the second moment in time.

Many further features and combinations thereof concerning the present improvements will appear to those skilled in the art following a reading of the instant disclosure.

DESCRIPTION OF THE FIGURES

In the figures,

FIG. 3A is a top view of a portion of the production line of FIG. 1, showing a field of view of a camera encompassing a moving wood product at a first moment in time;

FIG. 3B is an example of an image acquired at the first moment in time shown in FIG. 3A;

FIG. 3C is an example of an image to be projected by a light projector at a second moment in time subsequent to the first moment in time;

FIG. 3D is a top view of the portion of the production line of FIG. 1, showing a field of illumination of the light projector at the second moment in time;

DETAILED DESCRIPTION

Figure 1:
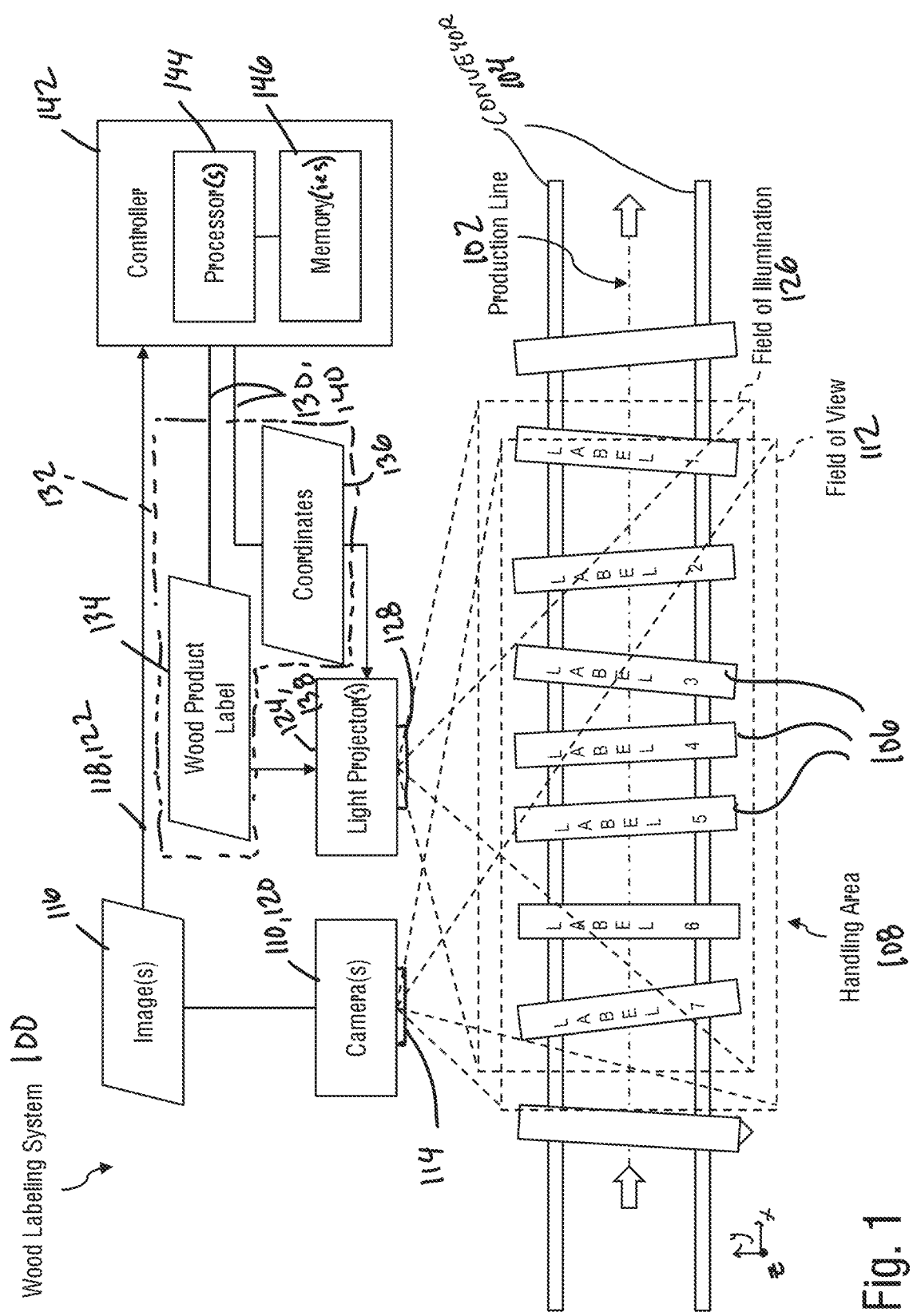
FIG. 1 is a schematic view of an example of a wood product production line, incorporating an exemplary wood labeling system, in accordance with one or more embodiments.

FIG. 1 shows an example of a wood labeling system 100 for a production line 102. As depicted, the wood labeling system 100 has a conveyor 104 moving wood products 106 across a handling area 108 of the production line 102. Example of such wood products 106 can include, but not limited to, lumbers, logs and the like (hereinafter simply referred to as "wood products 106").

In the illustrated embodiment, the wood products 106 are moved transversally from left to right along the x-axis, thereby defining a reference system (x, y, z) fixed relative to the handling area 108. However, in some other embodiments, the wood products 106 can be moved longitudinally along the y-axis, for instance.

It is intended that the handling area 108 is an area where operators can handle the wood products 106 as desired. For instance, such handling can include, but not limited to, manually translating one or more wood products 106, sequentially or simultaneously, along the x-axis or the y-axis, manually pivoting one or more wood products 106, sequentially or simultaneously, about the x-axis or the y-axis. One general purpose of such handling is to align the wood products 106 in a manner parallel and aligned from one another so as to facilitate further processing steps that may occur downstream along the production line 102. Examples of such processing are described below with reference to FIG. 5.

Still referring to FIG. 1, the wood labeling system 100 has one or more cameras 110 (hereinafter "the camera 110") having a field of view 112 encompassing at least a portion of the handling area 108. In some embodiments, the field of view 112 of the camera 110 can encompass the entirety of the handling area 108 whereas, in some other embodiments, the field of view 112 of the camera 110 can encompass only a fraction of the handling area 108. The camera 110 can have a zooming lens 114 to zoom the field of view 112 in or out as need may be.

In some embodiments, the camera 110 can be positioned above the handling area 108, with the field of view 112 pointing towards the handling area 108. In these embodiments, the field of view 112 can be preferably oriented along the z-axis, perpendicularly with a plane of the wood products 106, for instance. However, in some other embodiments, the field of view 112 of the camera can be oriented differently.

During use, the camera 110 can acquire one or more images 116 (hereinafter "the acquired image 116"), and generate an image signal 118 comprising the acquired image 116, representing one or more of the wood products 106 moving across the handling area 108 at a given moment in time. The acquired image 116, or equivalently the image signal 118, can be indicative of intensity values I associated to corresponding camera pixel coordinates ($x_{cp}$, $y_{cp}$). The acquired image 116 can be denoted $I(x_{cp}, y_{cp})$ in this example.

In some embodiments, the camera 110 is a video camera 120. In such embodiments, the video camera 120 can acquire a plurality of images 116, and generate a video signal 122 comprising the acquired images 116, representing one or more of the wood products 106 moving across the handling area 108 at a plurality of different moments in time $t_i$ (where i is an integer greater than unity). In these embodiments, the acquired images 116, or equivalently the video signal 122, can be indicative of intensity values I associated to corresponding camera pixel coordinates for each of the moments in time ($x_{cp}$, $y_{cp}$, $t_i$). The acquired images 116 can be denoted $I(x_{cp}, y_{cp}, t_i)$ in this example.

In this embodiment, the camera 110 has a frame rate of at least 20 images or frames per second (fps) and has a resolution of at least 1 megapixel. The frame rate of the camera 100, as well as its shutter speed, can be remotely controlled, for instance. It is noted that depending on the application, the camera 110 can be configured to generate 2D images and/or 3D images. As it will be understood, in an alternate embodiment, the camera 110 includes more than one camera unit such that the field of view 112 is composite (i.e., the field of view 122 results from the combination of more than one field of view of the corresponding camera units). Example of the camera 110 can include, but not limited to, model BFLY-PGE-13H2M-CS from make FUR Blackfly®.

As illustrated, the wood labeling system 100 has one or more light projectors 124 (hereinafter "the light projector 124") having a field of illumination 126 encompassing at least a portion of the handling area 108. In some embodiments, the field of illumination 126 of the light projector 124 can encompass the entirety of the handling area 108 whereas, in some other embodiments, the field of illumination 126 of the light projector 124 can encompass only a fraction of the handling area 108. The light projector 124 can have a zooming lens 128 to zoom the field of illumination 126 in or out as desired.

It is noted that the field of view 112 of the camera 110 can be made to correspond with the field of illumination 126 of the light projector 124 in some embodiments. However, in some other embodiments, the field of view 112 of the camera 110 overlaps with only a portion of the field of illumination 126 of the light projector 124. The field of view 112 and the field of illumination 126 can thus partially or wholly overlap with one another.

In some embodiments, the light projector 124 can be positioned above the handling area 108, with the field of illumination 126 pointing towards the handling area 108. In these embodiments, the field of illumination 126 can be preferably oriented along the z-axis, perpendicularly to the plane of the wood products 106, for instance. However, in some other embodiments, the field of illumination 126 of the light projector 124 can be oriented differently.

During use, the light projector 124 can receive a projection signal 130 comprising one or more projection images 132 (hereinafter "the projection image 132") to be projected across the handling area 108 at a given moment in time. More specifically the projection image 132 can have one or more wood product labels 134 (hereafter "the wood product label 134") to be projected at given coordinates 136 of the handling area 108 at the given moment in time. The projection image 132, or equivalently the projection signal 130, can be indicative of intensity values I associated to corresponding projector pixel coordinates ($x_{pp}$, $y_{pp}$). The projection images 132 can be denoted I($x_{pp}$, $y_{pp}$) in this example. Once received, the light projector 124 can project the received projection image 132 across the handling area 108, thereby projecting the wood product label 134 at the given coordinates 136 at the given moment in time.

In some embodiments, the camera pixel coordinates and the projector pixel coordinates are registered to one another in a manner that any camera pixel coordinates ($x_{cp,i}$, $y_{cp,i}$) and the projector pixel coordinates ($x_{pp,i}$, $y_{pp,i}$) correspond to the same coordinates ($x_i$, $y_i$) of the reference system (x, y) that is fixed relative to the handling area 108.

Such registering can be performed by calibrating the camera 110 relative to the light projector 124. In some embodiments, reference elements are positioned in a given pattern (e.g., 5 transversally spaced-apart white line elements) across the handling area 108 while the light projector 124 projects a corresponding pattern of light across the handling area 108. When the two patterns are adjusted to fully overlap with one another, the camera pixel coordinates of the camera 110 and the projector pixel coordinates of the light projector 124 can be calibrated to one another, e.g., by pressing a reference button. In some other embodiments, the camera 110 and the light projector 124 can be calibrated to one another using other calibration techniques.

The type and/or number of pieces of information carried by the wood product label 134 can differ from one embodiment to another. In some embodiments, the wood product label 134 can incorporate optimization data indicative of how the corresponding wood product 106 can be cut to optimize its profitability, identification data indicating an order number of a given wood product 106 in the queue of wood products 106, a type of the given wood product 106, a grade of the given wood product 106, a price, and the like. In some embodiments, the wood product label 134 can include cut markings showing where cuts are to be made on each wood product 106 so that the cuts can be readily assessed by nearby operator(s).

In some embodiments, the light projector 124 is a video projector 138. In such embodiments, the video projector 138 can receive a video signal 140 comprising a plurality of projection images 132 to be projected across the handling area 108 at a plurality of different moments in time $t_i$. In these embodiments, the projection images 132, or equivalently the video signal 140, can be indicative of intensity values I associated to corresponding projector pixel coordinates for a plurality of moments in time ($x_{pp,i}$, $y_{pp,i}$, $t_i$). The projection images 132 can be denoted I($x_{pp,i}$, $y_{pp,i}$, $t_i$) in this example. Once received, the light projector 124 can project the received projection images 132 across the handling area 108 at the moments in time $t_i$, thereby projecting the wood product label 134 at its corresponding coordinates 136 for each moment in time $t_i$. As can be noted, when the coordinates 136 of the wood product label 134 varies from one moment in time to another, the projected wood product label 134 can appear to be in movement in any reference system (x, y) fixed relative to the handling area 108.

In this embodiment, the light projector 124 has a frame rate of at least 20 fps and has a resolution of at least 1 megapixel. The frame rate of the light projector 124, as well as its shutter speed, can be remotely controlled, for instance. As it will be understood, in an alternate embodiment, the light projector 124 includes more than one light projector unit such that the field of illumination 126 is composite (i.e., the field of illumination 126 results from the combination of more than one field of illumination of the corresponding light projector units). Example of the light projector 124 can include, but not limited to, laser projector such as model NP-P252UL from make NEC. In some embodiments, it was found convenient to select light projectors 124 which are suited for projecting blue light or white light on the wood products 106, as such colors can provide satisfactory contrast in acceptable lighting conditions.

The wood labeling system 100 has a controller 142 which is in communication at least with the camera 110 and with the light projector 124. Such communication can be wired, or wireless, or both depending on the embodiment. The controller 142 has one or more processors 144, and one or more memories 146 storing instructions that when executed by the processors 144 can perform steps of a method of labeling wood products 106 along the production line 102 using the wood labeling system 100. A detailed embodiment of the controller 142 is described below with reference to FIG. 4. In some embodiments, the controller 142 is remote from the production line. The controller 142 can be part of a computer (e.g., a personal computer, mobile device, etc.) in some embodiments.

Figure 2:
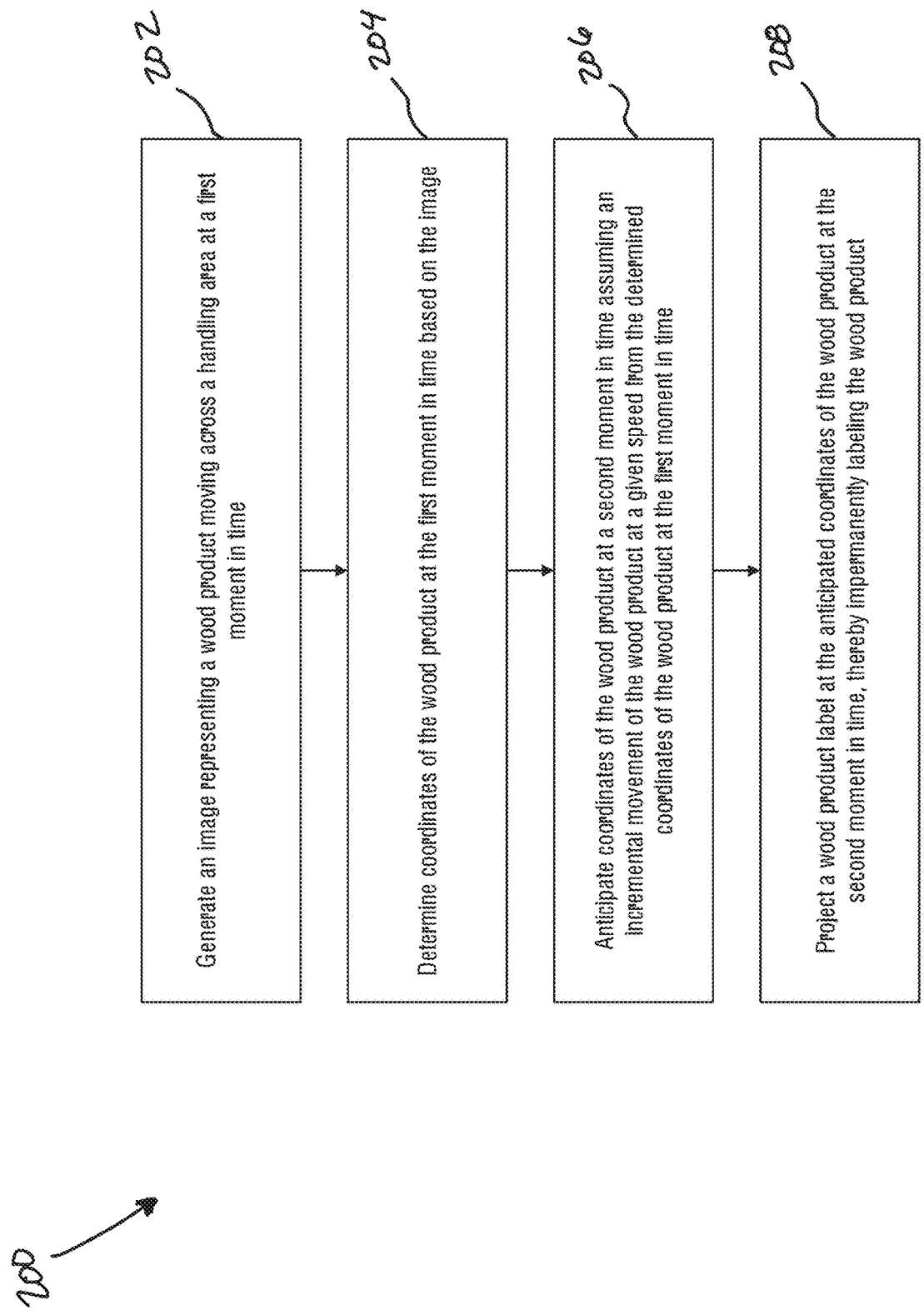
FIG. 2 is a flowchart of an example of a method of labeling wood products moved across a handling area of the production line of FIG. 1, in accordance with one or more embodiments.

Referring now to FIG. 2, there is shown an example of such a method 200 of labeling wood products 106. The method 200 is described with reference to the wood labeling system 100 of FIG. 1 for ease of reading. However, it is intended that the method 200 can be performed by any other suitable embodiment of the wood labeling system(s) described herein.

At step 202, the camera 110 generates an image ($x_{cp}$, $y_{cp}$, $t_1$) representing a wood product 106 moving across the handling area 108 at a first moment in time $t_1$. At step 204, the controller 142 determines coordinates of the wood product 106 at the first moment in time $t_1$ based in the image ($x_{cp}$, $y_{cp}$, $t_1$). At step 206, the controller 142 anticipates coordinates of the wood product 106 at a second moment in time $t_2$ assuming an incremental movement of the wood product 106 at a given speed v from the determined coordinates of the wood product 106 at the first moment in time $t_1$. At step 208, the light projector 124 projects a wood product label 134 at the anticipated coordinates 136 of the wood product 106 at the second moment in time $t_2$, thereby impermanently labeling the wood product 106.

FIGS. 3A through 3D illustrate an iteration of the method 200 as a wood product 106 is moved across the handling area. In this example, the wood product is moved transversally from left to right across the handling area at a transverse speed vx.

More specifically, FIG. 3A shows a top view of the handling area 108 of the production line 102. As depicted, the field of view 112 of the camera 110 encompasses a portion of the handling area 108. The illustrated wood product 106 is shown at a first moment in time $t_1$ at which it lies at given coordinates $x_1$, $y_1$ of the handling area 108. For instance, in this embodiment, the given coordinates of the wood product are indicative of a first transverse position $x_1$ of the wood product 106 in the handling area 108 at the first moment in time $t_1$. Optionally, the given coordinates of the wood product 106 can be indicative of a first longitudinal position $y_1$ of the wood product 106 in the handling area 108 at the first moment in time $t_1$. In this specific embodiment, the first transverse position $x_1$ corresponds to a transverse position of an upstream edge 106a of the wood product 106. However, in some other embodiments, the first transverse position $x_1$ can correspond to a transverse position of the center 106b of the wood product 106 or to a transverse position of a downstream edge 106c of the wood product 106.

FIG. 3B shows an image 116 as acquired by the camera 110 at the first moment in time $t_1$ shown in FIG. 3A. As shown, the acquired image 116 is indicative of intensity values I as function of camera pixel coordinates $(x_{cp}, y_{cp})$. In some embodiments, the controller 142 determines, from the acquired image $I(x_{cp}, y_{cp})$, the camera pixel coordinates of a representation of the wood product 106' in the acquired image 116. For instance, the controller 142 may determine that the camera pixel coordinates of the representation of the wood product 106' at the first moment in time $t_1$ are $(x_{cp1}, y_{cp1})$. In some other embodiments, the camera pixel coordinates of the representation of the wood product 106' can be registered in a reference system (x, y) fixed relative to the handling area 108, thereby yielding coordinates $(x_1, y_1)$.

FIG. 3B also shows a representation of the wood product 106'' at a second moment in time $t_2$, after the first moment in time $t_1$, assuming an incremental movement Δx of the wood product 106 at the transversal speed $v_x$ from the determined coordinates $(x_{cp1}, y_{cp1})$ or $(x_1, y_1)$ of the wood product 106 at the first moment in time $t_1$. In some embodiments, the controller 142 anticipates, from the coordinates $(x_{cp1}, y_{cp1})$ or $(x_1, y_1)$, the coordinates of the wood product 106 at the second moment in time $t_2$. For instance, the controller 142 may anticipate that the coordinates of the wood product 106 at the second moment in time $t_2$ are $(x_2, y_2)$ assuming a difference Δt in time between the first and second moments in time $t_1$ and $t_2$ (Δt=$t_2-t_1$) at the transverse speed $v_x$ from the coordinates $(x_{cp1}, y_{cp1})$ or $(x_1, y_1)$. In these embodiments, the coordinates $(x_2, y_2)$ may be registered in a reference system of the camera 110 and/or of the light projector 124, thereby yielding camera or projector pixel coordinates $(x_{cp2}, y_{cp2})$ or $(x_{pp2}, y_{pp2})$. In some other embodiments, the controller 142 may anticipate that the camera or pixel coordinates $(x_{cp2}, y_{cp2})$ or $(x_{pp2}, y_{pp2})$ of the wood product 106 at the second moment in time $t_2$ directly from the camera pixel coordinates $(x_{cp1}, y_{cp1})$ by performing an arithmetical operation (e.g., addition, multiplication) on the first transversal coordinate $x_{cp1}$, for instance. It is noted that the representation of the wood product 106'' at the second moment in time $t_2$ has been shown in the acquired image 116 for understanding purposes, the controller 142 need not to superpose a representation of the wood product 106'' at the second moment in time $t_2$ on the acquired image 116.

FIG. 3C shows an example of a projection image 132 that can be generated by the controller 142 based on the coordinates $(x_{cp2}, y_{cp2})$ or $(x_{pp2}, y_{pp2})$ of the wood product 106 at the second moment in time $t_2$ and on the wood product label 134. As shown, the wood product label 134 is positioned at projector pixel coordinates associated to the anticipated coordinates $(x_2, y_2)$, $(x_{cp2}, y_{cp2})$, or $(x_{pp2}, y_{pp2})$ of the wood product 106 at the second moment in time $t_2$. More specifically, in this specific embodiment, the wood product label 134 is spaced away from the coordinates $x_{cp,2}$ of the upstream edge of the wood product 106 in a manner that results in the wood product label 134 being centered on the wood product 106 instead of being inconveniently centered on the upstream edge of the wood product 106. For instance, the projected wood product label 134 can be downstream from the transverse position $x_{cp,2}$ by a spacing corresponding to a half-width of the wood product. In this example, the projection image 134 is empty except for the wood product label 134 at the anticipated coordinates $(x_{pp2}, y_{pp2})$. Accordingly, at the second moment in time $t_2$, the projector 124 can project the projection image 132 across the handling area 106, thereby superposing the projection of the wood product label 134 onto the wood product 106, such as shown in FIG. 3D.

In some embodiments, the determined coordinates of the wood product 106 at the first moment in time $t_1$ are indicative of a position and an orientation of the wood product 106 relative to a reference system (x, y) fixed relative to the handling area 108. In such embodiments, the projection of the wood label product 134 on the wood product 106 can involve rotating the wood label product 134 in accordance with the determined orientation of the wood product 106. However, the step of rotating the projection of the wood label product 134 may inconveniently impede the computational tasks of the controller 142 and therefore can be neglected relatively inconsequently.

Although FIGS. 3A through 3D show only one iteration of the method 200 described above, in some embodiments, the method 200 can be repeated a plurality of different moments in time $t_i$, thereby projecting the wood product label at a plurality of different coordinates across the handling area 108. By repeating the method 200 in a successive and swift manner, the projected wood product label 134 can appear to be moving along with the wood product 106. Depending on the embodiments, the projected wood product label 134 can appear to be in movement in a reference coordinate (x, y) fixed relative to the handling area 108 while appearing to be fixed in a reference of the wood product 106. In such embodiments, a given wood product 106 being conveyed across the handling area 108 can be followed at a glance by an operator with no or minimal effort as the wood product label 134 follows the given wood product 106 in a continuous, or quasi-continuous, manner. It is noted that, in some embodiments, as the wood product label 134 moves in the reference system (x, y) of the handling area 108, the wood product label 134 may not completely fixed relative to the reference system of the moving wood product 106. Indeed, the wood product label 134 may still move within a given tolerance and still conveniently appear to follow the given wood product 106.

For the wood labeling system 100 to work in a satisfactory manner, the repetition rate of the method 200 can be above a given threshold. The incremental period of time Δt between two successive moments in time $t_i$ and $t_{i+1}$ can be about a fraction of a second. In some embodiments, the incremental period of time Δt between two successive repetition of the method 200 should be sufficient to allow i) acquisition of the image, ii) transmission of the acquired image to the controller 142, iii) processing of the acquired image, iv) determination of the coordinates of the representation of the wood product in the acquired image, v) anticipation of the coordinates of the wood product after a given incremental movement, vi) transmission of the projection image to the image projector 124. In these embodiments, the incremental period of time Δt between two successive repetitions of the method 200 can range between 50 ms and 300 ms, preferably between 80 ms and 150 ms, and most preferably 100 ms. In some embodiments, even if the images are generated at a frame rate of about 28 fps, which generates an image at each 35 ms, the incremental period of time Δt between two successive repetitions of the method 200 can be of about 100 ms as there can be a delay between the moment in time at which an image is generated and the moment in time at which processing (including at least some of the steps identified above) of the image ends. Still in these embodiments, the anticipated coordinates of the wood product 106 are calculated based on the given incremental movement that the wood product 106 can travel over the whole incremental period of time Δt, not just over the acquisition time of the image, for instance.

In some other embodiments, it was found convenient to set the frame rate of the camera 110 at about the frame rate of the light projector 124. For instance, in some embodiments, the frame rates of the camera 110 and of the light projector 124 is about 28 fps. When the projection frame rate is equivalent to the acquisition frame rate, it was found that the projected wood product label 134 can more continuously follow the moving wood product 106. Indeed, should the frame rate of the light projector 124 exceeds that of the camera, there can be iterations of the method where the light projector projects the same image twice or more at the same anticipated coordinates, which may appear as odd. To address this issue, each time a given projection image is to be projected twice at the same anticipated coordinates, the controller 142 can incrementally moves the anticipated coordinates forward based on the preceding coordinates and on the speed at which the wood product is moved. In such embodiments, it may be convenient to associate a serial number to each projection image generated by the processor 142 and then, each time projection images having the same serial number is to be projector, an incremental movement can be applied to the preceding anticipated coordinates.

In some embodiments, imperfect edge of a given wood product 106, and/or image contrast inadequacies, can cause the determined coordinates of the given wood product 106 at successive moments in time $t_i$ to go backward even if the wood product 106 continuously moves forward along the production line 102. In such embodiments, to avoid the projected wood product label to flicker between backward and forward transversal positions, the controller 142 can be configured to ensure that once the coordinates of the given wood product are determined, these coordinates can only move in the forward direction, not in the backward direction. In some embodiments, coordinates of a given wood product can be moved backwards only if it is determined that the representation of the wood product 106 has moved backward of a given pixel number threshold (e.g., 10 pixels), after which it can be assumed that the wood product has been moved backward by an operator. Proceeding accordingly has been found to solve at least some flickering issues in some situations. Additionally or alternately, the controller 142 can average the determined coordinates of a given wood product over a given number of preceding coordinates. For instance, the determined coordinates can be an average of the ten preceding coordinates of the wood product. Additionally or alternately, the controller 142 can be configured to apply a Kalman filter to the determined coordinates of the wood product, which can also provide smoothness to varying determined coordinates.

Although FIGS. 3A through 3D show that the method 200 is performed for a single wood product 106, it is intended that the method 200 can be performed simultaneously for a plurality of wood products 106 disposed across the handling area 108 in some other embodiments. In these embodiments, the light projector 124 can project a projection image 132 comprising a plurality of wood product labels 134 at a plurality of corresponding coordinates across the handling area 108. Each wood product 106 can thus have its corresponding wood label product 134 projected thereon as it moves across the handling area 108. In some embodiments, when a difference in coordinates of a given one of the wood products is determined from one image to another, the same difference in coordinates can be applied to all the other wood products of the image, thereby reducing the computational requirements on the controller 142.

The controller 142 can be provided as a combination of hardware and software components. The hardware components can be implemented in the form of a computing device 400, an example of which is described with reference to FIG. 4. Moreover, the software components of the controller can be implemented in the form of a software application.

Figure 4:
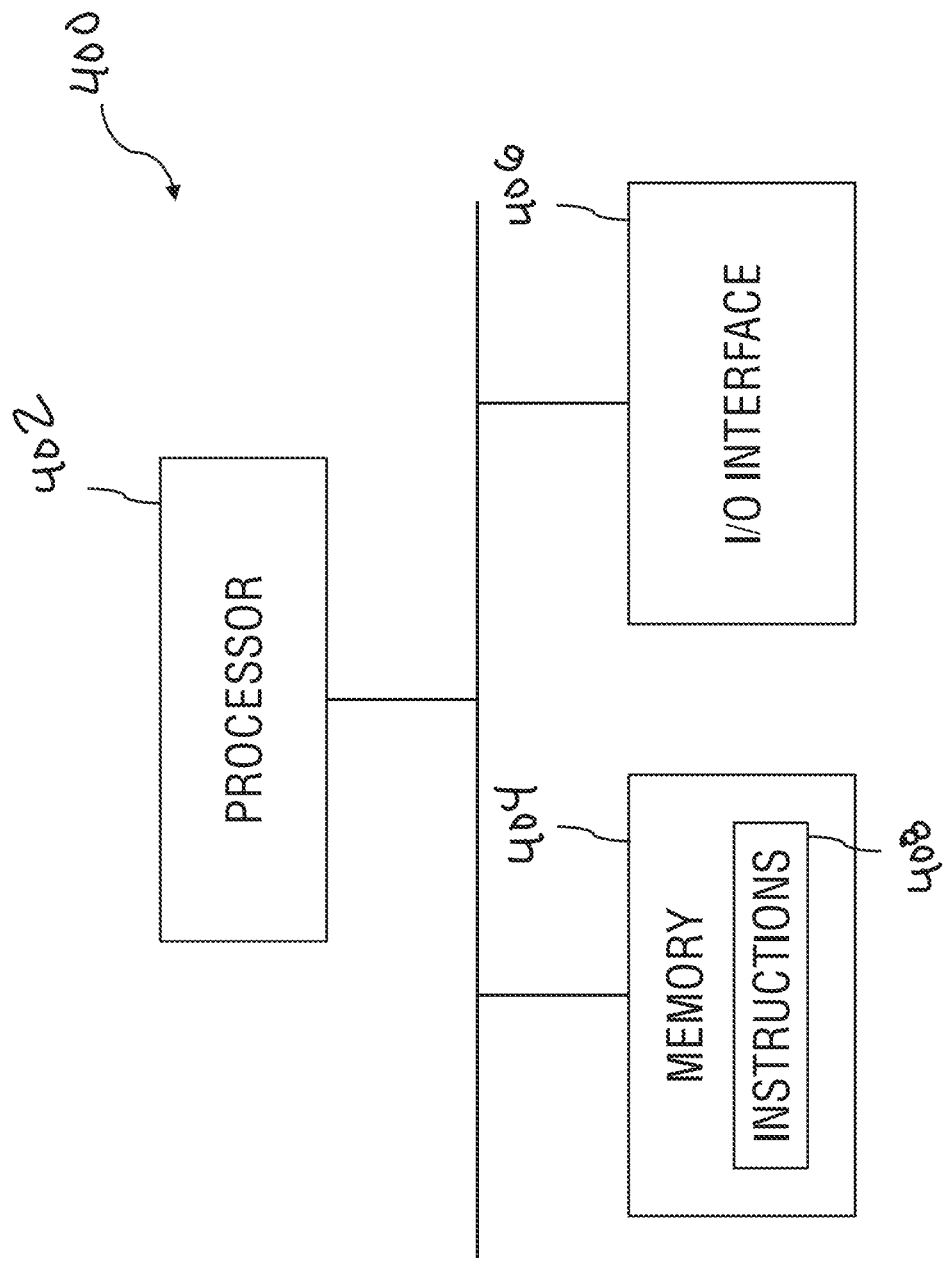
FIG. 4 is a schematic view of an exemplary computing device of a controller of the wood labeling system of FIG. 1, in accordance with one or more embodiments.

Referring to FIG. 4, the computing device 400 can have a processor 402, a memory 404, and I/O interface 406. Instructions 408 for implementing a method of impermanently labeling the wood products, such as the one described above, can be stored on the memory 404 and accessible by the processor 402.

The processor 402 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 404 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 406 enables the computing device 400 to interconnect with one or more input devices, such as camera(s) 110, temperature sensor(s), lighting sensor(s), an optimizer, or with one or more output devices such as light projector(s) 124, a lighting system, a trimmer and the like.

Each I/O interface 406 enables the controller 142 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, a software application performing the method 200 is stored on the memory 404 and accessible by the processor 402 of the computing device 400. The computing device 400 and such a software application are meant to be examples only. Other suitable embodiments of the controller 142 can also be provided, as it will be apparent to the skilled reader.

Figure 5:
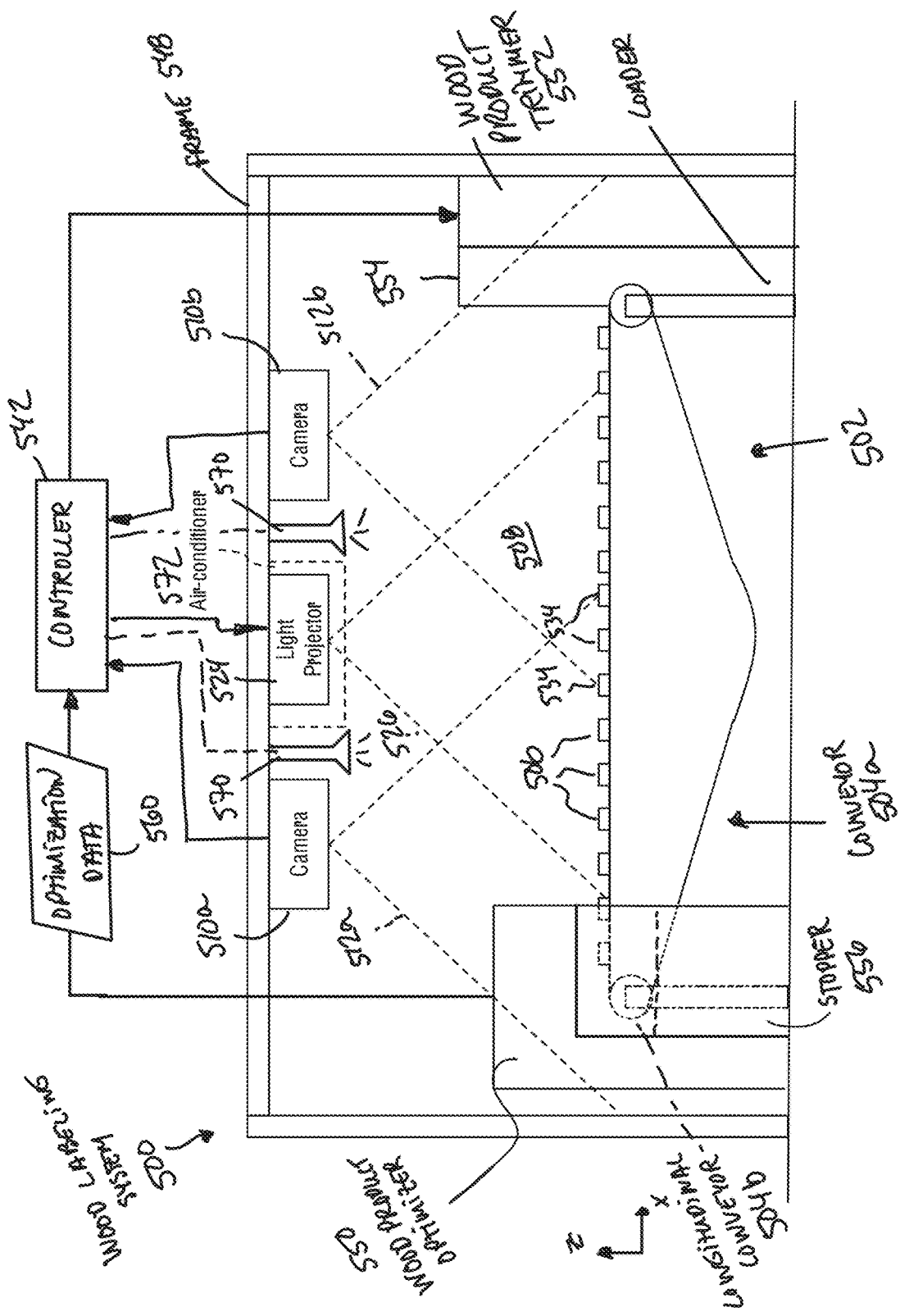
FIG. 5 is a side view of another example of a wood product production line, incorporating another example of wood labeling system, shown sandwiched between an optimizer and a trimmer, in accordance with one or more embodiments.

FIG. 5 show another example of a wood labeling system 500 for a production line 502. As depicted, the wood labeling system has a transverse conveyor 504a moving a plurality of wood products 506 across a handling area 508 of the production line 502.

The wood labeling system 500 has first and second cameras 510a, 510b mounted to a frame 548 and having fields of view 512a, 512b encompassing at least a portion of the handling area 508. The first and second cameras 510a, 510b can generate an image representing at least one of the wood products 506 moving across the handling area 508 at a given moment in time. As shown, the first and second cameras 510a, 510b are positioned so that their respective fields of view 512a, 512b are abutted to one another, with no or almost no overlap therebetween. In this way, images acquired by the cameras 510a, 510b at a given moment in time can be placed side-by-side and be fully representative of the fields of views 512a, 512b of the cameras 510a, 510b, with no omission or redundancy.

The wood labeling system 500 has a light projector 524 mounted to the frame 548 and having a field of illumination 526 encompassing at least a portion of the handling area 508. As shown, the light projector 524 can be positioned anywhere between the first and second cameras 510a, 510b, and preferably exactly at the center between the two cameras 510a, 510b. As shown in this example, the first and second cameras 510a, 510b and the light projector 524 are mounted over the production line 502, and are oriented vertically downwards along the z-axis.

More specifically, in this example, the cameras 510a, 510b and the light projector 524 are at 8 feet above the wood products 506. Also in this example, the field of illumination 526 of the light projector 524 can span about 5 feet across the handling area 508 along the x-axis.

The wood labeling system 500 has a controller 542 which may or may not be mounted to the frame 548. The controller 542 is communicatively coupled to the first and second cameras 510a, 510b and to the light projector 524. Accordingly, the light projector 524 can project, at a subsequent moment in time, wood product labels 534 at coordinates of the wood products 506 anticipated from the acquired images as determined by the controller 542.

In the example illustrated in FIG. 5, the production line 502 includes an optimizer 550 and a trimmer 552 sandwiching the wood labeling system 500. An optional wood product loader 554 can be provided upstream from the trimmer 552 and proximate thereto to load each wood product 506 into the trimmer 552. In this example, a longitudinal conveyor 504b is provided to route the wood products 506 towards an end of the transversal conveyor 504a. It is understood that in other embodiments, the number, type and arrangement of conveyor(s) may differ. Since longitudinal speeds involved in the production line 502 are relatively fast (e.g., between 366 m/min and 610 m/min), a stopper 556 can be provided proximate to the end of the transversal conveyor 504a to stop each wood product 506 as they are "thrown" by the longitudinal conveyor 504b towards the stopper 556.

For instance, the longitudinal conveyor 504b is used to move the wood products 506 along a longitudinal path and across an optimization area proximate to the optimizer 550. The transverse conveyor 504a is used to move the wood products 506 from an end of the transverse conveyor 504a, along a transverse path at a transverse speed $v_x$, across the handling area 508 of the production line 502 and towards a downstream cutting area proximate to the trimmer 552. Handling of the wood products 506 for manual and visual inspection may be limited to the handling area 508, as discussed above.

The optimizer 550 is configured to scan successive ones of the wood products 506 and to generate optimization data 560 for each wood product 506. In this example, the optimization data 560 are sequentially transmitted to the trimmer 552 in a particular order such that a queue of optimization data 560 arrives at the trimmer 552 during use. The optimization data 560 can include identification data indicating an order number of a given wood product in the queue, a type of the given wood product, a grade of the given wood product, a price, etc.

It is thus understood that any reordering of the wood products 506 between the optimizer 550 and the trimmer 552 may lead to a wood product 506 being trimmed using the optimization data 560 of another wood product 506 and cause inefficiencies in the production line 502. For instance, some wood products 506 may be reordered from their given order following unexpected bouncing onto the stopper 556. Some other wood products may be reordered by handling of the wood products 506 in the handling area 508. Other reasons for reordering may also apply. An example of a method and system for tracking the wood products 506 in the handling area 508 is described in U.S. patent Ser. No. 10/178,355, the content of which is hereby incorporated by reference.

In this embodiment, the controller 542 can perform a wood tracking program which allows the controller 542 to track the optimization data 560 of each wood product 506 across the acquired images representing the handling area 508 such that, when a given wood product 506 arrives at the trimmer 552, the controller 542 can transmit corresponding optimization data 560 for proper cutting.

It is intended that the projected wood product labels 534 can incorporate the optimization data 560 for each of the wood product 506 as they are moved across the handling area 508. In this way, operator(s) can read the optimization data that is projected on each wood product 506 in order to assess whether the optimization data 560 are correct, and stop the production line 102 should there be any problem with the projected optimization data. This can allow to reduce time associated with a validation procedure of the optimization data to ensure that the optimizer 550 works in a satisfactory manner in the production line 502. For instance, it may be possible to validate the optimization data 560 of 20 wood products 506 in less than 4 minutes. Projecting the optimization data right on the corresponding wood product 506 also reduce the risk of errors as the operator has to look at a remote display screen to see the associated between the wood products 506 and the optimization data 560.

Still referring to FIG. 5, the wood labeling system 500 has a lighting system 570 for lighting the handling area 508 during use of the wood labeling system 500. As shown in the illustrated example, the lighting system 570 is controllable by the controller 542 to provide a controlled lighting environment to the handling area 508 at all times, if need be. For instance, the controller 542 can transmit a control signal to the lighting system 570 in order to modify the lighting of the handling area 508 based on the images acquired from the cameras 510a, 510b. However, the lighting system 570 of the wood labeling system 500 is optional. Indeed, in some embodiments, the handling area 508 is illuminated by a conventional lighting system of a facility in which the wood labeling system is used. In some other embodiments, natural illumination (e.g., sunlight) of the handling area 508 may be sufficient to allow the cameras 510a, 510b to generate satisfactory images in at least some cases. The cameras 510a, 510b can have a sensibility which compensates for a poor illumination of the handling area 508.

In this example, the wood labeling system 500 has an air-conditioner 572 cooling the light projector 524 which can allow constant and smooth operation of the light projector 524 over time. It was found that when the light projector 524 heats above a given temperature threshold, as may be sensed using a dedicated sensor temperature, the quality of the projection may decrease, as well as the expected life span of the light projector 524, which may render the projected wood product data unreadable. Accordingly, the air-conditioner 570 can be activated when the temperature of the light projector 524 exceeds a given temperature threshold.

Figures 6A, 6B:
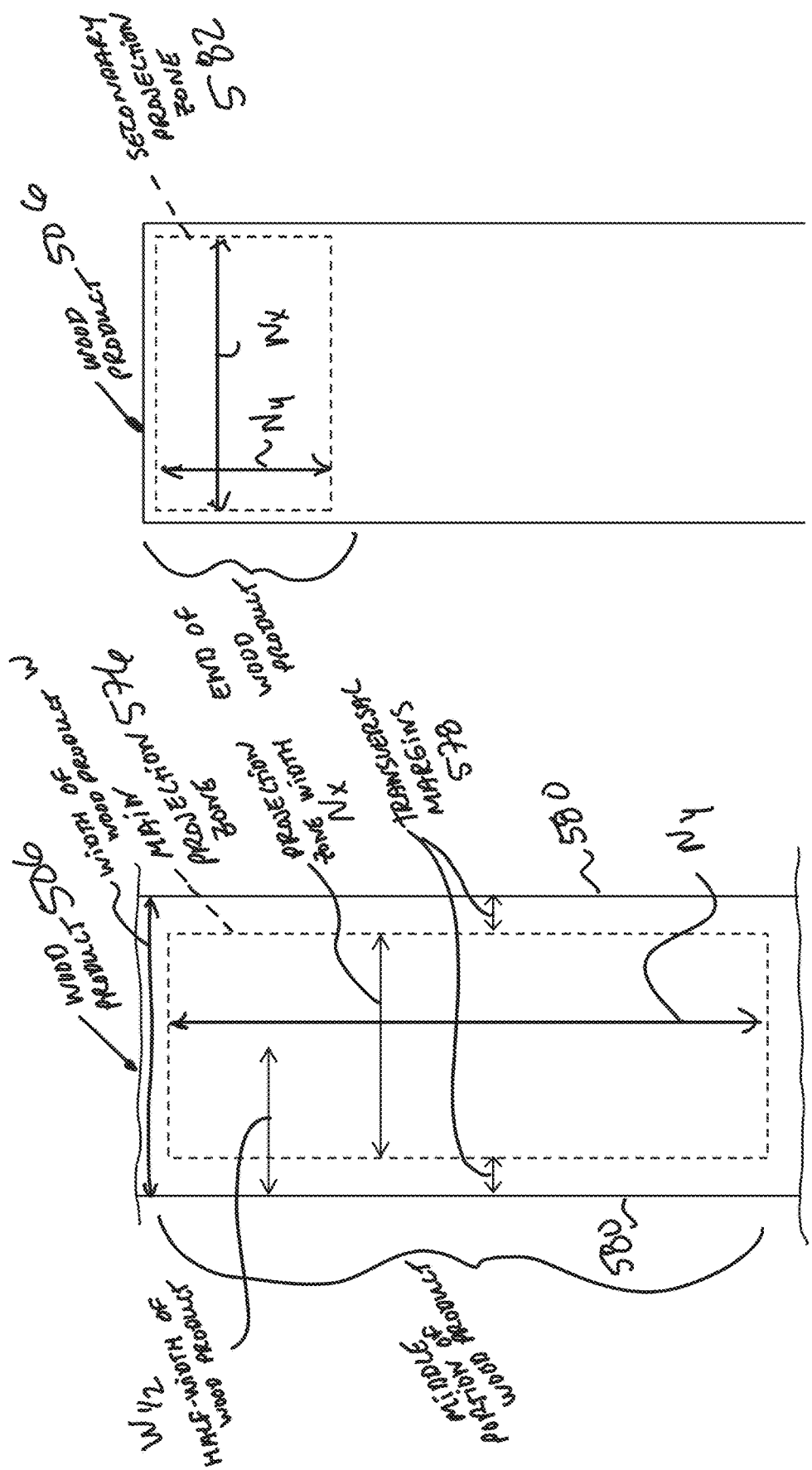
FIG. 6A is an enlarged top view of an example of a middle portion of a wood product, showing a main projection zone, in accordance with one or more embodiments.
FIG. 6B is an enlarged top view of an example of an end of a wood product, showing a secondary projection zone, in accordance with one or more embodiments.

In this embodiment, the controller 542 can be configured to identify one or more projection zones on each one of the wood products 506. FIG. 6A shows an example of a main projection zone 576. In this example, the main projection zone 576 is centered longitudinally and transversally relative to the wood product 506. The main projection zone 576 can be determined to be centered at a half-width of the wood product 506, with transversal margins 578 on either transverse sides 580. Each transversal margin 578 can be about 10% of a width w of the wood product. FIG. 6B shows an example of a secondary projection zone 582. In this example, the secondary projection zone 582 is positioned at a longitudinal end of the wood product. Each projection zone can be set to a predetermined number of projector pixels in the x-axis ($N_x$) and to a predetermined number of projector pixels in the y-axis ($N_y$).

Figure 7:
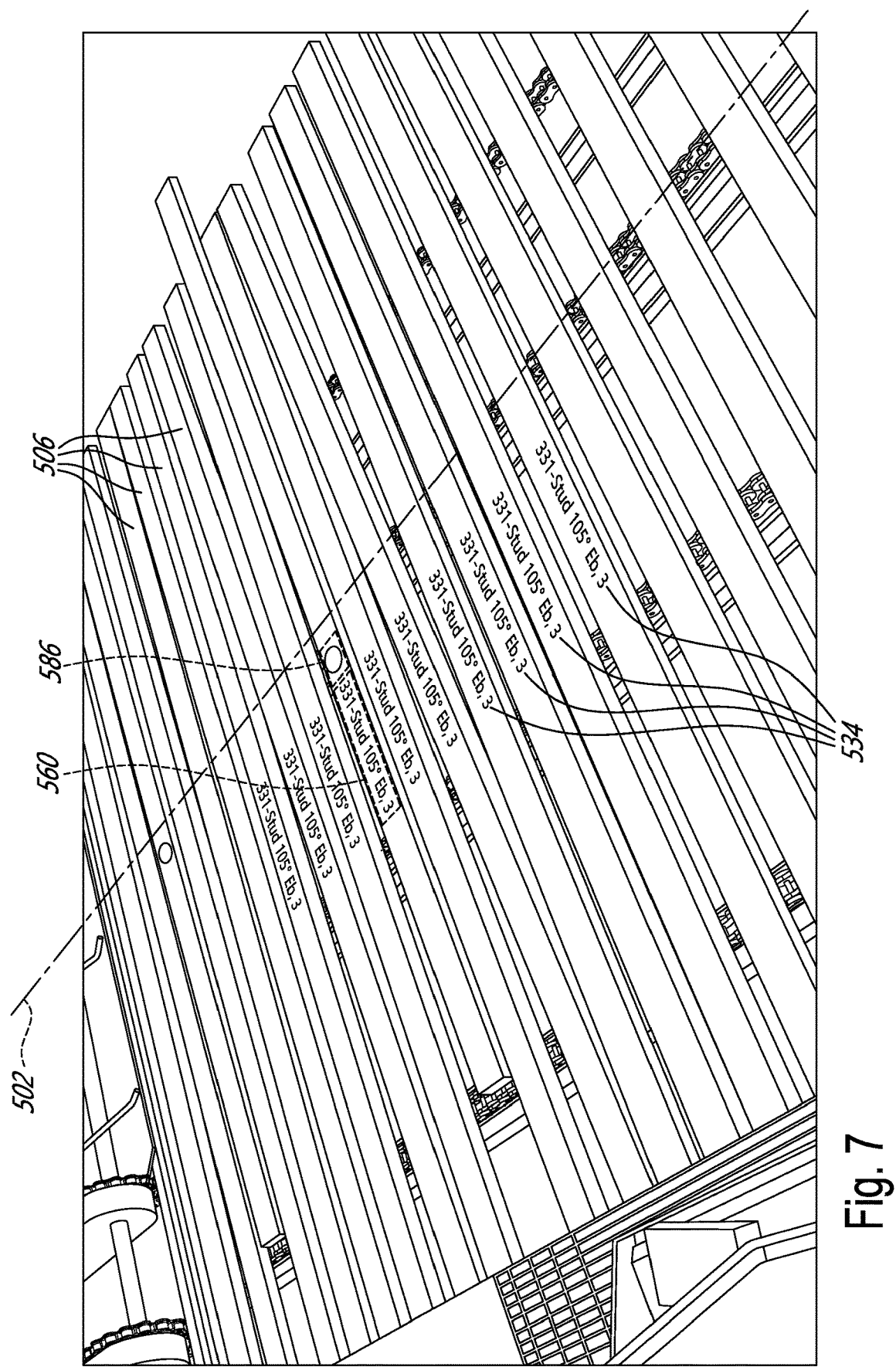
FIG. 7 is an oblique view of projected wood product labels following corresponding wood products along the production line of FIG. 5, in accordance with one or more embodiments.

Depending on the embodiment, it can be preferred to project optimization data 560 on the main projection zone 576 and possible cuts, as dictated by the optimization data 560, on the secondary projection zone(s) 582. FIG. 7 shows an example of wood products 506 transversally moving along the production line 502. The projected wood product labels 534 includes optimization data 560 in the main projection zone. A portion of the main projection zone is dedicated to project alert data 586 indicating that a given one of the wood products are not satisfactorily positioned along the production line 102. For instance, in this example, the alert data is provided in the form of a colored dot, projected just below the optimization data 560.

As can be understood, the examples described above and illustrated are intended to be exemplary only. For instance, although not mentioned above, one or more reflective elements can be provided between the camera and/or the light projector and the wood products so as to redirect the field of view and/or the field of illumination where desired. In an embodiment, the trimmer can be provided in the form of an edger. Moreover, in another embodiment, the conveyor associated with the optimizer can be a transversal conveyor. In such an embodiment, the wood products may be tied to one another as they pass under the optimizer and then be freed from one another prior to arrival in the handling area. In some embodiments, the projected wood product label follow the moving wood product even when the wood product is moved outside the handling area in embodiments where auxiliary system(s) (with auxiliary camera(s) and auxiliary light projector(s)) are provided. A video signal can comprise a first image acquisitioned by a given camera and a second image taken by the given camera at a later moment in time. A video signal can comprise a first image taken by a first camera and a second image taken by a second camera different from the first camera, but taken at a later moment in time. The scope is indicated by the appended claims.

What is claimed is:

1. A method of labeling wood products moved across a handling area of a production line, the method comprising:
   using a camera having a field of view encompassing at least a portion of said handling area, generating an image representing a wood product moving across the handling area at a first moment in time;
   using a controller,
      determining coordinates of the wood product at the first moment n time based on the image; and
      anticipating coordinates of the wood product at a second moment in time assuming an incremental movement of the wood product at a given speed from the determined coordinates of the wood product at the first moment in time; and
   using a light projector having a field of illumination encompassing at least a portion of said handling area, projecting, at the second moment in time, a wood product label at the anticipated coordinates of the wood product at the second moment in time.

2. The method of claim 1 wherein said method is performed for a plurality of wood products simultaneously, thereby projecting wood product labels at a plurality of subsequent coordinates across the handling area.

3. The method of claim 1 wherein the camera and the light projector have reference systems being fixed relative to a reference system of the handling area and being registered to one another.

4. The method of claim 1 wherein said generating and said projecting are performed at a same frame rate.

5. The method of claim 1 wherein the field of view of the camera and the field of illumination of the camera overlap with one another.

6. The method of claim 1 further comprising repeating said method at a plurality of subsequent moments in time, thereby projecting the wood product label at a plurality of subsequent coordinates across the handling area.

7. The method of claim 6 wherein the projected wood product label is in movement in a reference coordinate of the handling area and fixed in a reference of the wood product.

8. The method of claim 6 wherein said camera is a video camera, said repeating including generating a video signal comprising a plurality of images representing the wood product moving across the handling area at a plurality of subsequent moments in time.

9. The method of claim 1 wherein said determining said coordinates includes determining pixel coordinates of a representation of the wood product in the image.

10. The method of claim 9 wherein said pixel coordinates are indicative of a position and an orientation of the representation of the wood product in the image.

11. The method of claim 9 further comprising registering said pixel coordinates in a reference system fixed relative to the handling area.

12. The method of claim 1 wherein the wood product is moved transversally across the handling area at a transverse speed, wherein said coordinates are indicative of a transverse position of the wood product in the handling area.

13. The method of claim 12 wherein said transverse position corresponds to a transverse position of an upstream edge of the wood product.

14. The method of claim 13 wherein said anticipated coordinates are downstream from said transverse position by a spacing corresponding to half of a transverse width of the wood product.

15. A wood labeling system for a production line, the wood labeling system comprising:
- a conveyor configured for moving a plurality of wood products across a handling area of the production line;
- a camera having a field of view encompassing at least a portion of said handling area and generating an image representing at least one of the wood products moving across the handling area at a first moment in time;
- a controller in communication with the camera, the controller determining coordinates of the wood product at the first moment in time based on the image, and anticipating coordinates of the wood product at a second moment in time assuming an incremental movement of the wood product at a given speed from the determined coordinates of the wood product at the first moment in time; and
- a light projector having a field of illumination encompassing at least a portion of said handling area and in communication with the controller, the light projector projecting, at the second moment in time, a wood product label at the anticipated coordinates of the wood product at the second moment in time.

16. The wood labeling system of claim 15 wherein said camera is a video camera generating images at a first frame rate, said light projector being a video projector projecting wood product labels at a second frame rate corresponding to the first frame rate of the video camera.

17. The wood labeling system of claim 15 further comprising an air-conditioner cooling said light projector.

18. The wood labeling system of claim 15 further comprising a wood product optimizer positioned along the production line and a wood product trimmer positioned downstream from the wood product optimizer in the production line, the handling area being between the wood product optimizer and the wood product trimmer.

19. The wood labeling system of claim 18 wherein the projected wood product label includes optimization data received from the wood product optimizer.

\* \* \* \* \*